Dec. 30, 1947.  C. H. WITTHOFFT  2,433,499
BALL BEARING
Filed May 20, 1946
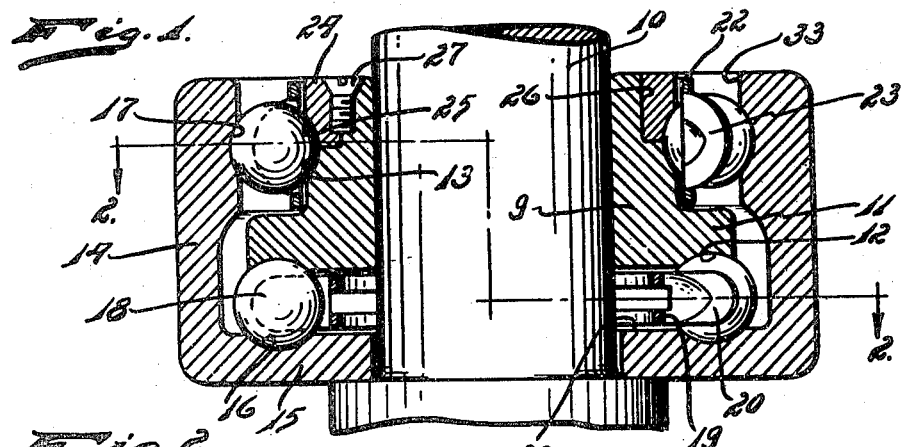
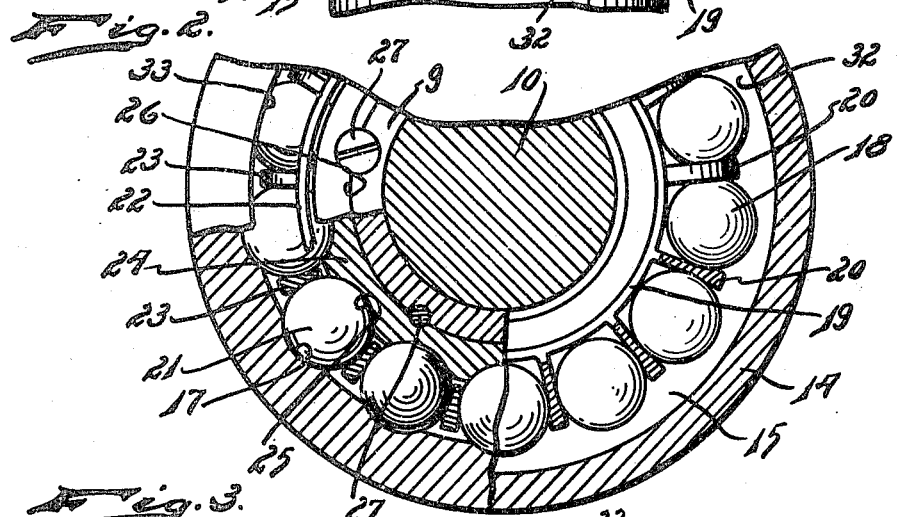
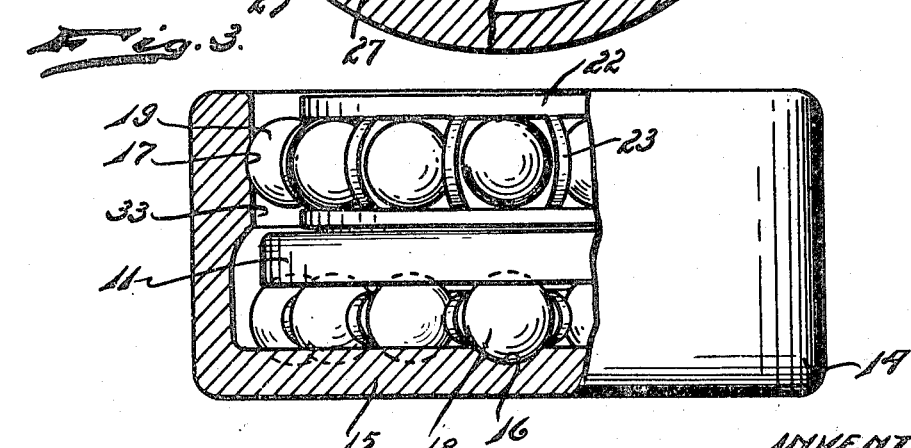
INVENTOR
CHARLES H. WITTHOFFT
BY
ATTORNEY Patented Dec. 30, 1947

2,433,499

UNITED STATES PATENT OFFICE 2,433,499

BALL BEARING

Charles H. Witthofft, Detroit, Mich., assignor of forty per cent to Joseph F. Gohn, Detroit, Mich.

Application May 20, 1946, Serial No. 670,953

4 Claims. (Cl. 308—174)

My invention relates to a new and useful improvement in a bearing adapted for use on rotating shafts and has for its object the provision of a bearing whereby a minimum friction will be encountered upon a rotating of a shaft and a bearing so constructed and arranged that it will also operate as a thrust bearing and prevent a tilting of the bearing.

Another object of the invention is the provision of a bearing possessed of a minimum number of parts and having two sets of antifriction members such as ball bearings or rollers positioned in alignment with each other and axially spaced apart and so arranged that the resistance of one set of bearings will be transmitted to the resistance of the other set of bearings thus minimizing the total frictional resistance.

Another object of the invention is the provision of a bearing having a plurality of sets of bearing members and associated means so constructed and arranged that the device may be easily and quickly assembled and dis-assembled.

Other objects will appear hereinafter.

It is recognized that various modifications and changes may be made in the detail of structure illustrated without departing from the invention itself and it is intended that such shall be embraced within the scope of the claims which form a part hereof.

Forming a part of this specification are drawings in which,

Fig. 1 is a central, longitudinal, sectional view of the invention,

Fig. 2 is a fragmentary sectional view taken on line 2—2 of Fig. 1,

Fig. 3 is a side elevational view of the invention with a part broken away and a part shown in section.

As shown on the drawings I provide an annular member 9 which is adapted to embrace the shaft 10 and rotate in unison therewith. This annular member 9 is provided with a radially directed flange 11 at one end having a curvilinear groove 12 formed on the one face thereof and provided with the curvilinear groove 13 adjacent the upper end or adjacent the end on which the flange is not mounted. I also provide an annular member 14 which embraces, in spaced relation, the annular member 9 and which is provided at one end with the inwardly directed flange 15. Formed in the inner face of the flange 15 is the groove 16 which is curvilinear in cross-section. Formed in the inner face of the annular member 14 is a groove 17 which is also curvilinear in cross-section. A set of balls 18 engage in the groove 16 and 12, these balls 18 being spaced apart by the spacing plates 20 projecting outwardly from the retaining ring 19, the flange 15 being spaced apart from the end face of the annular member 9 sufficient to provide a channel 32 in which the retainer 19 may freely rotate as clearly shown in Fig. 1.

A set of balls 21 engage in the grooves 13 and 17, these balls being spaced apart by the spacing plates 23 and which project outwardly from the retaining ring 22, this retaining ring lying in the space 33. A securing ring 24 is seated in the recess 26 formed in the annular member 9 and retained in position by the screws 27 which are threaded into the member 24 and into the annular member 9. The outer face of this securing ring 24 is provided with the groove 25 which is curvilinear in cross-section and in which engages the balls 21.

In assembling the device the annual member 14 is first placed in position and the balls 18, with their retainer, are located in the member 14. The annular member 9 is then pressed onto the shaft 10 so as to rotate in unison therewith and the balls 21 and their retainer are then placed in position. The securing ring 24 is then secured as shown in Fig. 1 and thus the bearing is then assembled in position. When in use the angular member 14 would, of course, be mounted in the suitable journal or other support and retained in stationary position while the shaft 10 rotates. In disassembling the structure it is necessary to remove the securing ring 24 and then the balls 21 with their retainer 22 must be removed.

It is believed obvious that an end thrust delivered to the shaft or through the shaft would be resisted by the bearing which has been described while a bearing for rotary purposes is also provided. Any tendency on the part of the shaft 10 to tilt would effect a tilting of the member 9 and this would be resisted by the pressure of the balls 21 and also the pressure of the balls 18. Consequently, a bearing is provided in which tilting or disalignment of the shaft is prevented and a most efficient structure is thus provided.

What I claim as new is:

1. A bearing of the class described adapted for mounting on a shaft comprising: an annular member mounted on and rotatable in unison with a shaft; a radially projecting flange on one end of said member, the end face of said flange having a circumferential groove formed therein circular in cross-section, said annular member at its opposite face having a recess formed in its periphery and provided with a peripheral groove curvilinear in cross-section opening into said recess; an annular member embracing said first named annular member and having an opening formed therethrough for reception of said shaft; an inwardly projecting flange on said annular member at one end, said flange having on its inner face a circumferential groove curvilinear in cross-section and registering with the groove in the end face of said first named annular member; a plurality of balls engaging in the groove in the faces of said flanges and retaining the same in spaced relation, said second named annular member having a circumferential groove formed on its inner face and curvilinear in cross-section and in registration with the groove formed adjacent the upper end of said first named annular member; a plurality of balls engaging in said last named grooves and spacing said annular members apart; and a securing ring seated in the recess in said first named annular member and having on its periphery at its inner end a circumferential groove seating in which are said second named balls.

2. A bearing of the class described adapted for mounting on a shaft comprising: an annular member mounted on and rotatable in unison with a shaft; a radially projecting flange on one end of said member, the end face of said flange having a circumferential groove formed therein circular in cross-section, said annular member at its opposite face having a recess formed in its periphery and provided with a peripheral groove curvilinear in cross-section opening into said recess; an annular member embracing said first named annular member and having an opening formed therethrough for reception of said shaft; an inwardly projecting flange on said annular member at one end, said flange having on its inner face a circumferential groove curvilinear in cross-section and registering with the groove in the end face of said first named annular member; a plurality of balls engaging in the groove in the faces of said flanges and retaining the same in spaced relation, said second named annular member having a circumferential groove formed on its inner face and curvilinear in cross-section and in registration with the groove formed adjacent the upper end of said first named annular member; a plurality of balls engaging in said last named grooves and spacing said annular members apart; and a securing ring seated in the recess in said first named annular member and having on its periphery at its inner end a circumferential groove seating in which are said second named balls; and means engaging said first named annular member and said securing ring for securing the same in position.

3. A bearing of the class described comprising: An inner annular member having an opening formed therethrough for reception of a shaft upon which mounted; an outward projecting peripheral flange on one end of said inner annular member, said flange, adjacent its outer edge having in its end face circumferential grooves curvilinear in cross-section, said annular member having a recess in its periphery extending around the same and inwardly from the opposite end and provided on its periphery with a circumferentially extending groove curvilinear in cross-section opening into said recess; an outer annular member embracing said inner annular member and spaced therefrom; an inwardly projecting flange on one end of said outer annular member and spaced from the flange on said inner annular member and having in its face opposed to said inner annular member, a circumferential groove curvilinear in cross-section in registration with the groove in said first named flange; anti-friction balls engaged in said groove and spacing said flanges apart; a retainer positioned in the space between the flange on said outer annular member and the end face of said inner annular member for retaining said balls in spaced relation, said outer annular member having in its inner face a circumferential groove curvilinear in cross-section, in registration with the groove in said inner annular member which opens into said recess; anti-friction balls engaging in said last named grooves; a retainer for retaining said last named balls in spaced relation; and means engaging said last named balls for securing said inner annular member positioned within said outer annular member.

4. A bearing of the class described comprising: An inner annular member having an opening formed therethrough for reception of a shaft upon which mounted; an outward projecting peripheral flange on one end of said inner annular member, said flange, adjacent its outer edge having in its end face circumferential grooves curvilinear in cross-section, said annular member having a recess in its periphery extending around the same and inwardly from the opposite end and provided on its periphery with a circumferentially extending groove curvilinear in cross-section opening into said recess; an outer annular member embracing said inner annular member and spaced therefrom; an inwardly projecting flange on one end of said outer annular member and spaced from the flange on said inner annular member and having in its face opposed to said inner annular member, a circumferential groove curvilinear in cross-section in registration with the groove in said first named flange; anti-friction balls engaged in said groove and spacing said flanges apart; a retainer positioned in the space between the flange on said outer annular member and the end face of said inner annular member for retaining said balls in spaced relation, said outer annular member having in its inner face a circumferential groove curvilinear in cross-section, in registration with the groove in said inner annular member which opens into said recess; anti-friction balls engaging in said last named grooves; a retainer for retaining said last named balls in spaced relation; and an annular securing member engaging in said recess and having, adjacent one end on its periphery, circumferentially directed grooves curvilinear in cross-section for engaging said second named balls; and means for securing said securing member in position.

CHARLES H. WITTHOFFT.

REFERENCES CITED

The following references are of record in the file of this patent:

UNITED STATES PATENTS

| Number | Name | Date |
|--------|------|------|
| 1,179,693 | Brault | Apr. 18, 1916 |
| 896,877 | Witte | Aug. 25, 1908 |